Nov. 7, 1967     E. S. GANDRUD     3,351,140
ATTACHMENT FOR ROW WHEEL FOR AGRICULTURAL IMPLEMENTS
Filed Jan. 27, 1965
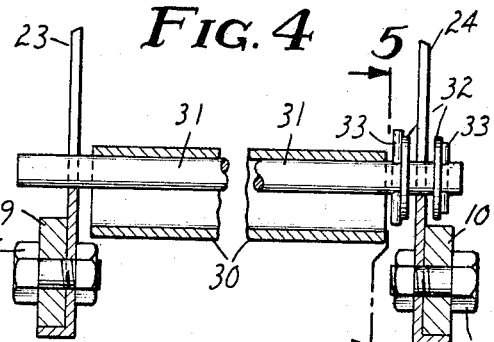
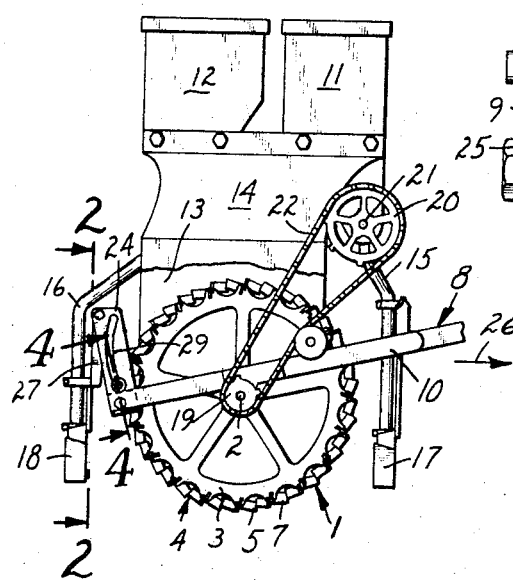
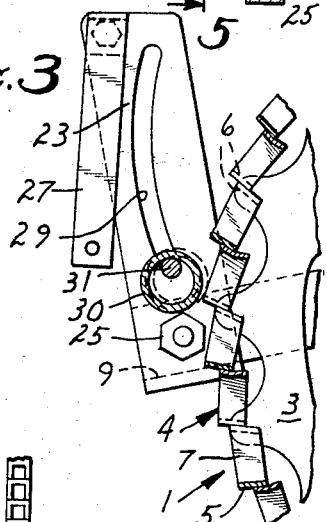
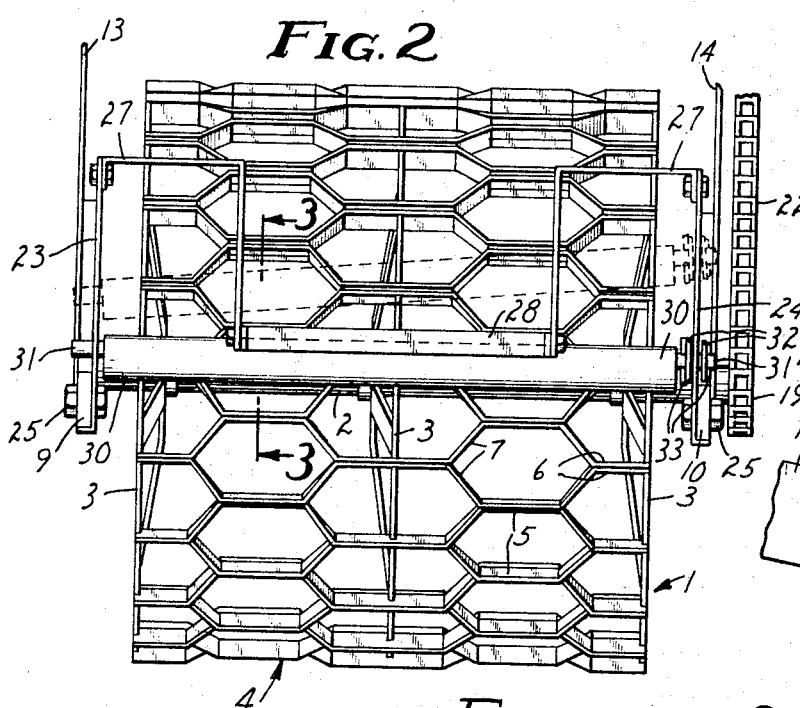
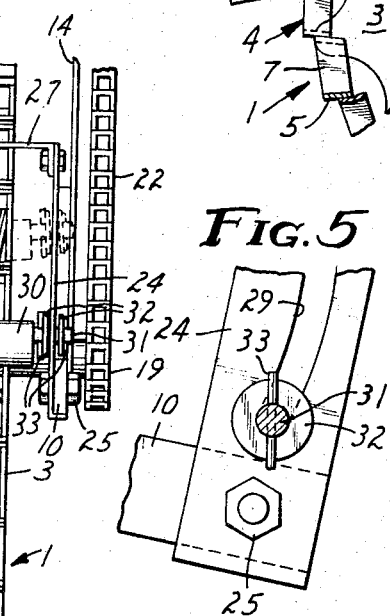
INVENTOR.
EBENHARD S. GANDRUD
BY
Merchant, Merchant & Gould
ATTORNEYS

United States Patent Office 3,351,140
Patented Nov. 7, 1967

3,351,140
ATTACHMENT FOR ROW WHEEL FOR AGRICULTURAL IMPLEMENTS
Ebenhard S. Gandrud, P.O. Box 528, Owatonna, Minn. 55060
Filed Jan. 27, 1965, Ser. No. 428,420
9 Claims. (Cl. 172—606)

ABSTRACT OF THE DISCLOSURE

An earth clod and stubble removing bar mounted adjacent its ends for free, guided movements in a generally vertical direction and toward and away from the rear cylindrical surface of foraminous earth working rollers or row wheels, when struck by foreign matter projecting from said surface such as clods of earth and stubble lodged in the foraminous structure of said wheel to loosen and remove said matter during normal rotation of said rollers or row wheels over tilled earth.

Background of the invention

The attachment of this invention is devised generally for use with rotary earth-engaging elements and particularly for use with row wheels of the type disclosed in my U.S. Letters Patent 3,220,368 and 3,220,369, which row wheels have generally cylindrical portions defining radial openings in which lumps of earth, mud or stubble may become lodged. Such row wheels are utilized in connection with planters and the like, for treating soil for the purpose of pest control.

Cleaning or scraping devices for removal of earth adhering to rotary agricultural implements are known to those versed in agricultural pursuits, such devices being used in connection with harrow or plow disks, pulverizing rollers, and the like. Such scraping and cleaning devices are usually adjustable but stationary in operation.

Summary of the invention

The present attachment comprises a rigid tubular bar having a relatively large inner diameter, an elongated relatively smaller diameter shaft extending longitudinally loosely through said bar, and a pair of mounting members for mounting the shaft and bar in a normally horizontally disposed position rearwardly of an earth treating roller. The shaft is operatively connected to the mounting members for bodily movements with said bar in directions generally upwardly and downwardly relative to the earth engaging generally cylindrical portion of the roller and toward and away from said cylindrical portion, whereby to engage clods or lumps of earth caught in the roller and dislodge the same responsive to rolling movement of the roller.

Description of the drawings

Referring to the drawings, which illustrate the invention, and in which like reference characters indicate like parts throughout the several views:

FIG. 1 is a fragmentary view in side elevation above an earth-treating roller or row wheel, showing my attachment mounted in connection therewith;

FIG. 2 is an enlarged fragmentary view partly in rear elevation and partly in section, as seen from the line 2—2 of FIG. 1;

FIG. 3 is a still further enlarged fragmentary section taken substantially on the line 3—3 of FIG. 2;

FIG. 4 is an enlarged fragmentary section taken substantially on the line 4—4 of FIG. 1; and FIG. 5 is a fragmentary section taken substantially on the line 5—5 of FIG. 4.

Referring with greater detail to the drawings, the numeral 1 indicates, in its entirety, an earth-treating roller or row wheel comprising an axial shaft 2, a plurality of axially spaced spoked flanges 3 mounted on the shaft 2, and a generally cylindrical portion 4 comprising a plurality of radial blades 5 having axially extended blade portions 6 and angularly disposed earth-compacting portions 7, the blades 5 being welded or otherwise rigidly secured to the marginal edge portions of the spoked flanges 3. The opposite end portions of the shaft 2 are journalled in suitable bearings on a frame structure 8 which includes a pair of laterally spaced frame members 9 and 10, the frame 8 being adapted to be connected to a conventional seed planter or the like, not shown, for common traveling movements therewith over a field, a row wheel 1 being disposed on a horizontal axis extending transversely of the direction of travel, for rolling movements on the ground rearwardly of the planter or like implement.

A pair of hoppers 11 and 12 are supported above the row wheel 1 by means of a pair of laterally spaced plate-like support members 13 and 14 that extend upwardly from the frame members 9 and 10 respectively. The hoppers 11 and 12 are adapted to deliver measured quantities of granular or powered chemicals to the ground through respective conduits 15 and 16 and distributor heads 17 and 18 respectively. As shown in FIG. 1, the distributor head 17 is disposed forwardly of the row wheel 1, whereas the distributor head 18 is disposed rearwardly of the row wheel 1. Although not shown, the hoppers 11 and 12 may be assumed to be provided with rotary agitators that are driven from the row wheel 1 by means including a sprocket wheel 19 fast on the shaft 2, a second sprocket wheel 20 on a shaft 21 suitably journalled in the support members 13 and 14, an endless link chain 22 entrained over the sprocket wheels 19 and 20, and conventional drive connections between the shaft 21 and the agitator or feeder members, not shown, but contained within the hoppers 11 and 12.

In view of the fact that the hoppers 11 and 12, as well as the conduits 15 and 16, distributor heads 17 and 18, and drive connections to the hoppers 11 and 12 do not in themselves comprise the instant invention, further detailed showing and description thereof is omitted, in the interest of brevity. It should suffice to state that when the row wheel 1 is rolled over the earth, the blades 5 thereof dig into the surface of the earth to compact the top soil and chemicals issuing from the distributor head 17 over the planted seed, rolling movement of the row wheel 1 causing the top soil to be cascaded generally upwardly and rearwardly, the cascaded soil incorporating thereinto the chemicals issuing from the distributor head 18, and falling to the surface of the earth to provide a loose, fluffy layer of top soil evenly distributed over the compacted sub-soil. This is fully disclosed in my copending application, above-identified.

Under certain operating conditions, such as when the soil is quite damp, the soil is sometimes apt to adhere to the blades 5 of the row wheel 1 and form clods or clumps in the radial openings defined by the blades 5. In other instances, wherein a field contains plowed-in trash, such as stubble from previous crops, portions of stubble occasionally become wedged in the abovementioned radial openings, the clods or stubble often interfering with the effective operation of the row wheel in producing a uniform fluffy layer of loose top soil over the compacted sub-soil. For the purpose of removing stubble from the radial openings, as well as clods or clumps of earth adhering to the row wheel, I provide a novel attachment, now to be described.

A pair of generally vertically disposed plate-like mounting members 23 and 24 are rigidly secured at their lower end portions to the rear ends of the frame members 9 and 10, by nut equipped bolts or the like 25. As shown, the mounting members 23 and 24 are disposed generally rearwardly of the row wheel 1, relative to the direction of traveling movement of the wheel 1, as indicated by the arrow 26 in FIG. 1. The upper ends of the mounting members 23 and 24 are connected by brackets 27 and a cross member 28, which brackets and cross member serve as supporting means for the conduit 16 and distributor head 18. The mounting members 23 and 24 are formed to provide aligned slots 29 that are elongated generally upwardly and downwardly in directions generally tangentially to the generally cylindrical portion of the row wheel 1. The mounting members 23 and 24 are adapted to support an elongated rigid tubular bar 30 therebetween by means of an elongated supporting shaft 31 extending longitudinally through the tubular bar 30 and having its opposite ends extending through the slots 29 of the mounting members 23 and 24. The tubular bar 30 has a relatively large inner diameter, the diameter of the shaft 31 being relatively small, whereby the tubular bar 30 is capable of movement in directions radially of the shaft 31, as indicated by full and dotted lines in FIG. 3. As shown, the bar 30 and shaft 31 are normally horizontally disposed in parallel relation to the axis of the row wheel 1 and just rearwardly of the cylindrical portion 4 thereof, the tubular bar 30 being capable of movement relative to the shaft 31 toward and away from the cylindrical portion 4 of the wheel 1. Further, the supporting shaft 31, while being normally supported at the lower ends of the slots 29, is capable of movement longitudinally of the slots 29, together with the tubular bar 30.

For a purpose which will hereinafter become apparent, the shaft 31 is capable of limited axial movements in the slots 29. Means for limiting such axial movements in opposite directions comprises a pair of axially spaced stop washers 32 loosely mounted on the shaft 31 each adjacent an opposite flat side surface of the mounting member 24, and a pair of stop pins 33 extending diametrically through the shaft 31, one intermediate one of the washers 32 and the adjacent end of the tubular bar 30, and the other intermediate the other washer 32 and the adjacent end of the shaft 31 laterally outwardly of the mounting member 24. See FIG. 4.

As the row wheel 1 rotates over the ground, any clods, pieces of stubble or the like which become lodged in the openings defined by the blades 5 and project radially outwardly therefrom, impinge against the tubular bar 30, this action usually jarring the pieces of stubble from the row wheel and breaking up clumps of earth, whereby the same will fall to the ground rearwardly of the wheel 1. Further, striking of the bar 60 by foreign matter projecting from the cylindrical portion 4 of the row wheel 1, will cause the tubular member 30 to move upwardly relative to the shaft 31 and generally radially outwardly relative to the row wheel 1. The bar 30 tends to bounce about relative to the shaft 31 further enhancing the impinging effect therebetween and other particles of foreign matter to more effectively dislodge the same from the row wheel. In the event that a large piece of stubble or clod becomes so firmly lodged in any one of the radial openings in the generally cylindrical portion 4 that initial impingement thereof against the bar 30 does not dislodge the same, the article of foreign matter engaging the bar 30 will cause the bar 30 and shaft 31 to be raised in the slots 29 to a point where the bar 30 will be moved out of the path of travel of the foreign material. After the foreign material has passed by, the bar 30 and the shaft 31 will fall by gravity to the lower ends of the slots 29 in the mounting members 23 and 24. Usually, such a large piece of foreign matter will become dislodged by impact with the bar 30 after one or two revolutions of the row wheel 1.

The spacing of the washers 32 and pins 33 from opposite sides of the adjacent mounting member 24 is sufficient to permit the shaft 31 and bar 30 to be angularly displaced from the normally horizontal position thereof, as shown by dotted lines in FIG. 2. Such angular displacement occurs when the bar 30 is struck by foreign material lodged in one of the radial openings in the cylindrical portion 4 adjacent one end or the other of the row wheel 1. As shown in FIG. 4, the shaft 31 is loosely slidable in the slots 29 of the supporting members 23 and 24, so that there is no binding between the shaft 31 and the mounting members 23 and 24 during such angular displacement of the shaft 31 and the bar 30. It will be further noted that the shaft 31 projects axially through the slot 29 in the mounting member 23 sufficiently to enable the shaft 31 to be angularly displaced from its normal horizontal position to the limit permitted by the length of the slots 29. Preferably, the pin 33 adjacent the bar 30 is of a length greater than the inner diameter of the tubular bar 30 to limit axial movement of the bar 30 toward the adjacent supporting member 14 and prevent the bar 30 from overlying the adjacent washer 32, which would otherwise impede free movement of the tubular bar 30 on the shaft 31.

In practice, it has been found that the above-described arrangement is imminently successful in maintaining the cylindrical portion 4 of the row wheel 1 clear of stubble, mud and clumps of earth and insuring the formation of a uniform layer of loose, fluffy top soil, not only by removing the clumps but by assisting in breaking up the same into small particles.

While I have shown and described a commercial embodiment of my attachment for row wheels and the like, it will be understood that the same is capable of modification without departure from the spirit and scope of the invention, as defined in the claims.

What I claim is:

1. An attachment for an earth-treating roller having a generally horizontal axis and an earth-engaging generally cylindrical portion defining radial openings, said attachment comprising, an elongated normally generally horizontally disposed rigid tubular bar having a relatively large inner diameter, and means including an elongated relatively small diameter shaft extending longitudinally through said tubular bar for loosely mounting said bar in radially outwardly spaced relation to said earth-treating roller rearwardly thereof relative to the direction of travel of the roller, said shaft normally supporting said tubular bar in generally parallel relation to the axis of said roller for limited free bodily movements generally toward and away from said roller.

2. An attachment for an earth-treating roller having a generally horizontal axis and an earth-engaging generally cylindrical portion defining radial openings, said attachment comprising, an elongated normally generally horizontally disposed tubular bar having a relatively large inner diameter, an elongated relatively small diameter shaft extending longitudinally through said tubular bar, and means including a pair of plate-like members each disposed adjacent a different end of said bar and each having a generally vertically elongated slot therein for free reception of the adjacent end portion of said shaft for supporting said shaft and bar in radially outwardly spaced relation to the cylindrical portion of said roller rearwardly relative to the direction of travel of the roller and generally parallel to the axis thereof and for free movements of said shaft and bar longitudinally of the slots in said mounting members.

3. The structure defined in claim 2 in further combination with stop means on one end portion of said shaft engaging the adjacent one of said mounting members to limit axial movements of said shaft in opposite directions relative to said mounting members.

4. In combination with an earth-treating roller having a generally cylindrical earth-engaging portion defining radial openings, and frame means journalling said roller on a generally horizontal axis for earth traversing movement, an elongated normally generally horizontally disposed rigid tubular bar having a relatively large inner diameter, and means including an elongated relatively small diameter shaft extending longitudinally through said bar and operatively coupled to said frame means for loosely mounting said bar in radially outwardly spaced relation to said roller rearwardly thereof relative to the direction of travel of the roller, said shaft normally supporting said bar in generally parallel relation to the axis of the roller for limited free bodily movements of said bar relative to said roller.

5. In combination with an earth-treating roller having a generally cylindrical earth-engaging portion defining radial openings, and a pair of frame members each disposed at an opposite end of said roller and journalling said roller on a generally horizontal axis for earth-traversing movement, said frame members having rear end portions extending rearwardly of the axis of said roller, an elongated normally horizontally disposed rigid tubular bar having a relatively larger inner diameter, an elongated relatively small diameter shaft extending longitudinally through said tubular bar, a pair of plate-like mounting members each mounted on the rear end portion of a different one of said frame members and each having a generally vertically elongated slot therein for free reception of an adjacent end portion of said shaft, said mounting members supporting said shaft and bar in radially outwardly spaced parallel relation to said roller and rearwardly thereof for limited free bodily movements of said shaft and bar longitudinally of the slots in said mounting members.

6. The structure defined in claim 5 in which one of said mounting members defines opposite side surfaces, the slot therein being open to said surfaces, and in further combination with a pair of axially spaced stop elements on said shaft adjacent one end thereof and each engageable with a different one of said surfaces to limit axial movement of said shaft relative to said mounting members.

7. The structure defined in claim 5 in which said slots are elongated in a direction generally tangentially with respect to said earth-engaging portions of the roller.

8. An attachment for a foraminous earth-treating row wheel comprising an elongated cylindrical bar mounted adjacent its ends for free, guided movements in a generally vertical direction and toward and away from the rear cylindrical surface of said earth treating row wheel, a carrying member for each end of said bar having a generally vertical slot therein and means mounting said carrying members outwardly of opposite ends of said row wheel, for freely supporting said bar in spaced relation to the cylindrical surface of said row wheel, the lower end of said slot being positioned from the periphery of said wheel to permit engagement of said bar therewith when normally freely supported therein.

9. The attachment defined in claim 8, characterized by a pair of axially spaced stop elements on said shaft means and engaging one of said mounting members to limit axial movement of said shaft means relative to said mounting members.

References Cited
UNITED STATES PATENTS

| | | | |
|---|---|---|---|
| 1,048,040 | 12/1912 | Coates | 172—547 |
| 2,223,707 | 12/1940 | Stilwell | 172—39 |
| 2,582,199 | 1/1952 | Gardner et al. | 94—50 |
| 2,669,919 | 2/1954 | Freeman | 172—39 |

ABRAHAM G. STONE, *Primary Examiner.*

WILLIAM A. SMITH III, *Examiner.*

A. E. KOPECKI, *Assistant Examiner.*